United States Patent
Benisty et al.

(10) Patent No.: US 10,564,857 B2
(45) Date of Patent: Feb. 18, 2020

(54) SYSTEM AND METHOD FOR QOS OVER NVME VIRTUALIZATION PLATFORM USING ADAPTIVE COMMAND FETCHING

(71) Applicant: Western Digital Technologies, Inc., San Jose, CA (US)

(72) Inventors: Shay Benisty, Be'er Sheva (IL); James Walsh, Santa Clara, CA (US); Rajesh Koul, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 192 days.

(21) Appl. No.: 15/810,632

(22) Filed: Nov. 13, 2017

(65) Prior Publication Data

US 2019/0146684 A1 May 16, 2019

(51) Int. Cl.
*G06F 3/06* (2006.01)
*G06F 13/42* (2006.01)

(52) U.S. Cl.
CPC .......... *G06F 3/0613* (2013.01); *G06F 3/0659* (2013.01); *G06F 3/0688* (2013.01); *G06F 13/4282* (2013.01); *G06F 2213/0026* (2013.01)

(58) Field of Classification Search
CPC ............. G06F 5/00–16; G06F 9/00–54; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885;
(Continued)

(56) References Cited

U.S. PATENT DOCUMENTS 8,595,385 B1 * 11/2013 Shapiro ................. G06F 13/385
709/253
9,626,309 B1 4/2017 Burke et al.
(Continued)

OTHER PUBLICATIONS

HippogriffDB: balancing I/O and GPU bandwidth in big data analytics; Li et al.; Proceedings of the VLDB Endowment, col. 9, iss. 4, pp. 1647-1658; Oct. 2016 (Year: 2016).*
(Continued)

*Primary Examiner* — Daniel C. Chappell
(74) *Attorney, Agent, or Firm* — Brinks Gilson & Lione

(57) ABSTRACT

Systems and methods for quality of service (QoS) using adaptive command fetching are disclosed. NVM Express (NVMe) implements a paired submission queue and completion queue mechanism, with host software on the host device placing commands into the submission queue. The memory device processes the commands through various phases including fetching, processing, posting a completion message, and sending an interrupt to the host. NVMe also includes an NVMe virtualization environment, which uses a subsystem with multiple controllers to provide virtual or physical hosts direct I/O access. QoS may be used so that the NVMe processes in the virtualization environment receive sufficient resources. In particular, bandwidth assigned to a submission queue may be considered when processing of commands (such as fetching of commands). In the event that the bandwidth assigned to the submission queue is exceeded, the processing of the commands (such as the fetching of the commands) may be delayed.

20 Claims, 12 Drawing Sheets

(58) Field of Classification Search
CPC .......... G06F 2206/00–20; G06F 2209/00–549;
G06F 2211/00–902; G06F 2212/00–7211;
G06F 2213/00–4004; G06F 2216/00–17;
G06F 2221/00–2153; G11C 11/00–5692;
G11C 13/00–06; G11C 15/00–06; G11C
16/00–3495; G11C 17/00–18; G11C
2216/00–30
See application file for complete search history.

(56) References Cited

U.S. PATENT DOCUMENTS

| | | | |
|---|---|---|---|
| 9,811,453 B1* | 11/2017 | Vaduvatha | G06F 12/00 |
| 2006/0161733 A1 | 7/2006 | Beckett et al. | |
| 2012/0151472 A1 | 6/2012 | Koch et al. | |
| 2013/0198311 A1* | 8/2013 | Tamir | G06F 15/167 |
| | | | 709/212 |
| 2014/0281040 A1 | 9/2014 | Liu | |
| 2014/0282514 A1* | 9/2014 | Carson | G06F 9/45533 |
| | | | 718/1 |
| 2015/0127882 A1 | 5/2015 | Carlson et al. | |
| 2015/0134857 A1* | 5/2015 | Hahn | G06F 3/061 |
| | | | 710/5 |
| 2015/0254088 A1* | 9/2015 | Chou | G06F 9/45541 |
| | | | 709/212 |
| 2016/0004438 A1 | 1/2016 | Moon et al. | |
| 2016/0077740 A1 | 3/2016 | Hussain et al. | |
| 2016/0085718 A1 | 3/2016 | Huang | |
| 2016/0117215 A1* | 4/2016 | Gadelrab | G06F 11/0742 |
| | | | 714/56 |
| 2016/0140041 A1* | 5/2016 | Niu | G06F 3/06 |
| | | | 711/103 |
| 2016/0147442 A1 | 5/2016 | Baderdinni et al. | |
| 2016/0188510 A1 | 6/2016 | Singh et al. | |
| 2016/0267016 A1 | 9/2016 | Lee et al. | |
| 2016/0292007 A1 | 10/2016 | Ding et al. | |
| 2016/0321012 A1 | 11/2016 | Clark et al. | |
| 2017/0075629 A1 | 3/2017 | Manohar et al. | |
| 2017/0075828 A1 | 3/2017 | Monji et al. | |
| 2017/0123659 A1 | 5/2017 | Nam et al. | |
| 2017/0177222 A1 | 6/2017 | Singh et al. | |
| 2017/0199765 A1* | 7/2017 | Ahn | G06F 9/4806 |
| 2017/0300263 A1* | 10/2017 | Helmick | G06F 3/0625 |
| 2017/0322897 A1* | 11/2017 | Benisty | G06F 13/37 |
| 2017/0366460 A1* | 12/2017 | Friedman | H04L 47/12 |
| 2018/0024778 A1* | 1/2018 | Singh | G06F 3/0604 |
| | | | 711/103 |
| 2018/0088978 A1* | 3/2018 | Li | G06F 9/45558 |

OTHER PUBLICATIONS

Summarizer: Trading Communication with Computing Near Storage; Koo et al.; 2017 50th Annual IEEE/ACM International Symposium on Microarchitecture; Oct. 14-17, 2017 (Year: 2017).*

FlexDrive: A Framework to Explore NVMe Storage Solutions; Malladi et al.; 2016 IEEE 18th International Conference on High Performance Computing and Communications; IEEE 14th International Conference on Smart City; IEEE 2nd International Conference on Data Science and Systems ; Dec. 12-14, 2016 (Year: 2016).*

H-NVMe: A hybrid framework of NVMe-based storage system in cloud computing environment; Yang et al.; 2017 IEEE 36th International Performance Computing and Communications Conference; Dec. 10-12, 2017 (Year: 2017).*

Janene Ellefson, SSD Product Market Manager—PCIe, Micron Technology, "NVM Express: Unlock Your Solid State Drives Potential", Flash Memory Summit 2013, Santa Clara, CA, 114 pages.

Kevin Marks, Dell, Inc., "An NVM Express Tutorial", Flash Memory Summit 2013, Santa Clara, CA, 92 pages.

* cited by examiner

| Field | Description |
|---|---|
| BWL count | Bandwidth Limiter Counter. |
| BWL Threshold | Bandwidth Limiter low and high Thresholds. |
| BWL Max | Bandwidth Limiter Maximum value. |
| BWL Update | Bandwidth Limiter Update.<br><br>This field holds the value that is added to the BWLcount whenever getting the periodic update pulse. |
| BWL Write Multiplier | Write Multiplier.<br><br>When getting a new command associated with this bandwidth limiter group, the BWLcount field is updated as follows assuming CommandSize is the transfer size of the command in 512 bytes granularity.<br><br>- Read command: BWLcount = BWLcount − CommandSize<br><br>- Write command: BWLcount = BWLcount − (CommandSize*WrMul) |
| V | Valid.<br><br>When set, this Bandwidth Limiter group is enabled. Otherwise, it is disabled and all values should be ignored. |
| SQ Disabled Bitmap Vector | SQ Disabled Bitmap.<br><br>This bitmap vector holds a flag for each physical SQ. A bit is set when the relevant SQ previously was disabled by this bandwidth limiter group. Otherwise, the bit is cleared. |

SYSTEM AND METHOD FOR QOS OVER NVME VIRTUALIZATION PLATFORM USING ADAPTIVE COMMAND FETCHING

BACKGROUND

Non-Volatile Memory Express (NVMe) is a standard for accessing non-volatile storage media attached via PCI Express (PCIe) bus. NVMe may be used with a variety of non-volatile storage media, such as solid state drives (SSDs). Part of the NVMe standard includes an NVMe virtualization environment. Virtualization environments may use an NVM subsystem with multiple controllers to provide virtual or physical hosts direct I/O access.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

FIG. 6 is a table of different fields for a bandwidth grouping.

DETAILED DESCRIPTION OF EMBODIMENTS

Overview

Figure 1A:
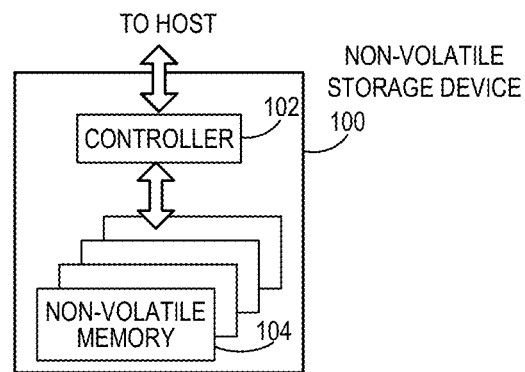
FIG. 1A is a block diagram of an exemplary non-volatile memory system.

As discussed above, the NVMe standard supports an NVMe virtualization environment. In such an implementation, the NVM subsystem within the NVMe virtualization environment may be composed of one or more primary controllers and one or more secondary controllers, where the secondary controllers depend on the one or more primary controllers for dynamically assigned resources. More specifically, the system may comprise a primary function (or master function) and a plurality (e.g., up to 128) virtual functions. The primary and virtual functions may be divided amongst a primary controller and secondary controller(s). Further, in one implementation, the primary and secondary controller(s) may be resident in a single device. Alternatively, the primary and secondary controller(s) may reside in multiple devices. In practice, a host may issue the Identify command to a primary controller specifying the Secondary Controller List to discover the secondary controllers associated with that primary controller. Further, an NVMe virtualization environment may have multiple (e.g., dozens) of Host applications using different virtual functions over the PCIe bus. The various virtual functions may be unaware of other virtual functions that the controllers are performing. In this regard, an NVMe virtualization environment with dozens of Host applications using different virtual functions over the PCIe bus may vie for resources and potentially starve more important resources to the various Host applications.

Thus, in one implementation, Quality of Service (QoS) is implemented in the NVMe virtualization environment. Generally speaking, QoS may be used to allocate sufficient resources to more important applications (e.g., mission-critical applications) so that the respective transactions can be processed in an acceptable amount of time. In this regard, QoS provides any one of the following benefits: provides the memory device control over bandwidth resources and allows the memory device to manage the network with different priorities and bandwidth allocation for each user; ensures that time-sensitive and mission-critical applications have sufficient resources while allowing other applications access to the media; improves user experience; and reduces costs by using existing resources efficiently.

One measure of QoS is bandwidth, such as the bandwidth directed to the data transfer between the memory device and the one or more hosts (e.g., via the PCIe bus). Typically, the bandwidth between the memory device and the one or more hosts may be limited to a specific data rate (e.g., 4 Gb/sec). Thus, in one implementation, the memory device may control the bandwidth consumed by the various submission queues, which may be organized based on different bandwidth groupings, as discussed below.

In a specific implementation, the memory device may compare bandwidth consumption associated with a particular submission queue with a bandwidth limit associated with the particular submission queue. In response to determining that the bandwidth consumption associated with the particular submission queue is equal to or greater than the bandwidth limit associated with the particular submission queue, the memory device determines to delay at least a part of the processing of the command. For example, the memory device may determine to delay fetching of one or more commands from the particular submission queue (such as delaying fetching of subsequent commands either currently in the particular submission queue or yet to be stored in the submission queue). Otherwise, responsive to determining that the bandwidth consumption associated with the particular submission queue is not equal to or greater than the bandwidth limit associated with the particular submission queue, the memory device determines to fetch the one or more commands from the particular submission queue without delay.

The particular submission queue may be associated with a bandwidth grouping (and in turn the bandwidth limit) in one of several ways. In one way, the particular submission queue may be directly correlated to the bandwidth limit (e.g., such as in a one-to-one correlation). In another way, the particular submission queue may be associated with a specific virtual function (which may have multiple submission queues associated with the specific virtual function). In turn, the specific virtual function may have an associated bandwidth limit. In still another way, the particular submission queue may be associated with a specific namespace. In turn, the specific namespace may have an associated bandwidth limit. In one implementation, namespace comprises a list of LBAs (Logical Block Addresses) in NVMe. In yet another way, a bandwidth grouping is associated with one or more NVMe command stream identifiers (IDs). In turn, the NVME command stream IDs may have associated therewith the particular submission queue. The association of the submission queues to the bandwidth groupings may be performed at various times in operating the memory device, such as at initialization of the memory device after power-up.

In the example of a PCIe bus having a maximum 4 Gb/sec bandwidth, bandwidth limits may be assigned to the various bandwidth groupings in one of several ways. In the example that the various physical submission queues are assigned to different bandwidth groupings, each physical submission may be assigned a bandwidth limit amount. In particular, submission queue "X" may be assigned a bandwidth limit amount of 1 Gb/sec. Likewise, other submission queues may be assigned various bandwidth limit amounts. In one implementation, the assignment of bandwidth limit amounts amongst the different bandwidth groupings may, in total, equal the maximum bandwidth. In one alternative implementation, the assignment of bandwidth limit amounts amongst the different bandwidth groupings may, in total, be less the maximum bandwidth. In another alternative implementation, the assignment of bandwidth limit amounts amongst the different bandwidth groupings may, in total, be greater the maximum bandwidth. In this case, the bandwidth grouping that first claims or appropriates this bandwidth may be entitled to this bandwidth. In practice, the commands fetched may be compared with the assigned bandwidth limit amounts to determine whether the commands fetched exceed the assigned bandwidth limit amount. If so, the memory device may temporarily delay fetching of additional commands.

In the example that the various virtual functions are assigned to different bandwidth groupings, each virtual functions may be assigned a bandwidth limit amount. One or more submission queues may be assigned to a particular virtual function. The particular virtual function may be assigned a bandwidth limit amount, such as 1 Gb/sec. Likewise, other virtual functions may be assigned various bandwidth limit amounts. In practice, the commands fetched from the one or more submission queues assigned to the particular virtual function may be compared with the assigned bandwidth limit amount to determine whether the commands fetched exceed the assigned bandwidth limit amount. If so, the memory device may temporarily delay fetching of additional commands. Similarly, bandwidth groupings directed to namespaces and stream IDs may be assigned bandwidth limit amounts, and may determine whether the commands fetched exceed the assigned bandwidth limit amounts.

The amount of bandwidth consumed may be expressed in one of several ways. For example, the amount of bandwidth consumed may be expressed as a bandwidth counter, with the value of the bandwidth counter indicative of the amount of bandwidth consumed. In particular, the counter value may be adjusted or modified based on the commands fetched (which results in an adjusted or modified counter value), which may affect the bandwidth on the PCIe bus. In practice, the value of the bandwidth counter may be compared with the assigned bandwidth limit amount to determine whether the value of the bandwidth counter exceeds the assigned bandwidth limit amount.

In a specific implementation, the bandwidth consumed (as indicated by the counter value) may depend on the type of commands fetched. As one example, different types of commands may have different effects on bandwidth on the PCIe bus or other type of communication interface. In particular, a write command (with X amount of data to write to non-volatile memory) may have a greater effect on bandwidth than a read command (also with X amount of data to read from non-volatile memory). In that regard, the memory device may adjust the value of the bandwidth counter depending on whether the command fetched is a write command or a read command.

The memory device may determine how long to delay fetching of the command in one of several ways. In one way, the memory device may allocate more bandwidth to various bandwidth groups to which the submission queues are assigned. The frequency at which more bandwidth is allocated and the amount of bandwidth allocated at the frequency may determine the length of the delay in fetching the command. For example, the memory device may allocate more bandwidth to the various bandwidth groups at predetermined intervals (e.g., every 1 mSec). Further, the amount of bandwidth allocated at the predetermined intervals may depend vary depending on the different bandwidth groups (e.g., a first bandwidth group may be allocated more bandwidth than a second bandwidth group). In the example of the bandwidth consumed being represented by a bandwidth counter (with the value of the bandwidth counter indicative of the amount of bandwidth consumed), the allocation of bandwidth may be represented by increasing or incrementing the value of the bandwidth counter. As discussed in more detail below, when the value of the bandwidth counter crosses a high level threshold, the submission queue(s) assigned to the counter may be re-enabled to fetch commands, thereby ending the delay.

Embodiments

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

FIG. 1A is a block diagram illustrating a non-volatile memory device 100. The non-volatile memory device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD) or a micro secure digital (micro-SD) card. In an alternate embodiment, the non-volatile memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
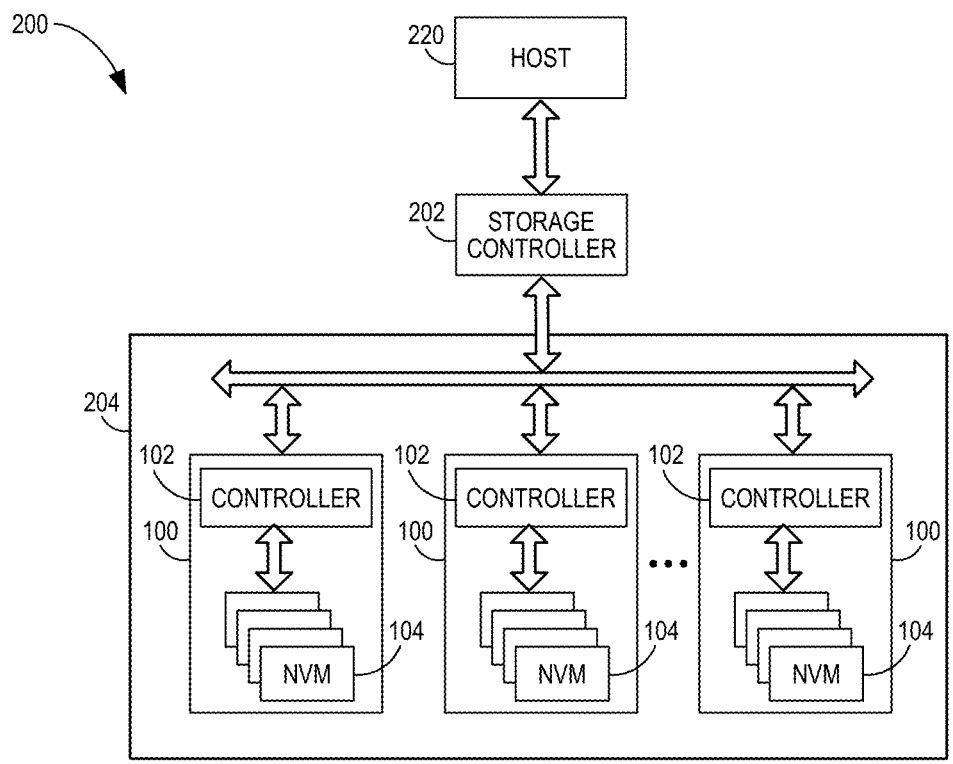
FIG. 1B is a block diagram of a storage module that includes a plurality of non-volatile memory systems and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA), a peripheral component interface express (PCIe) interface, an embedded MultiMediaCard (eMMC) interface, a SD interface, a Universal Serial Bus (USB) interface, or a fabric transport interface, as examples. The storage system 200, in one embodiment, may be a solid state drive (SSD), such as found in portable computing devices, such as laptop computers and tablet computers, and mobile phones.

Figure 1C:
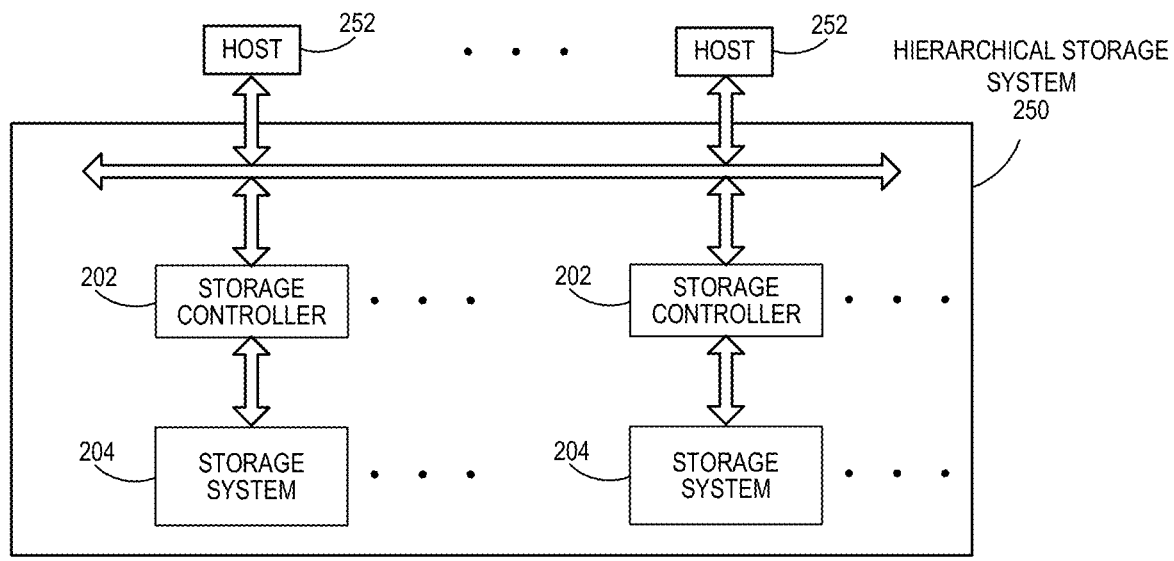
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
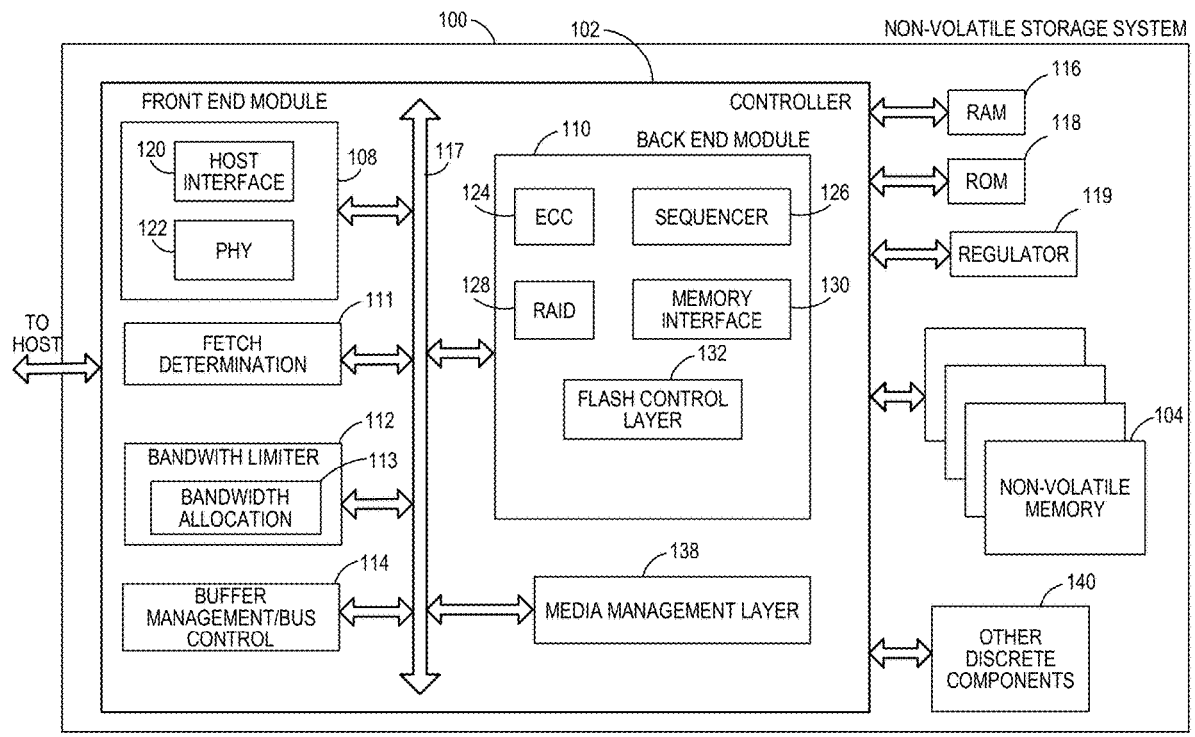
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies. As discussed below, in one implementation, the submission queues and the completion queues may be stored in the Controller Memory Buffer, which may be housed in RAM 116.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of storage system 100. One type of management table includes logical-to-physical address mapping table. The size of logical-to-physical address mapping table may grow with memory size. In this regard, the logical-to-physical address mapping table for high capacity storage device (e.g., greater than 32G) may be too large to store in SRAM, are may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Other modules of the non-volatile memory device 100 illustrated in FIG. 2A may include fetch determination 111, bandwidth limiter 112, and bandwidth allocation 113. As discussed in more detail below, the memory device may use fetch determination 111 in order to determine whether to fetch one or more commands from a particular submission queue for processing. Further, the memory device may use bandwidth allocation 113 in order to determine how often and how much bandwidth to allocate to various bandwidth groups. As discussed in more detail below, fetch determination 111 may use the bandwidth limiter 112, including the bandwidth allocated by bandwidth allocation 113, in order to determine whether to fetch a command or whether to delay fetching the command.

Figure 2B:
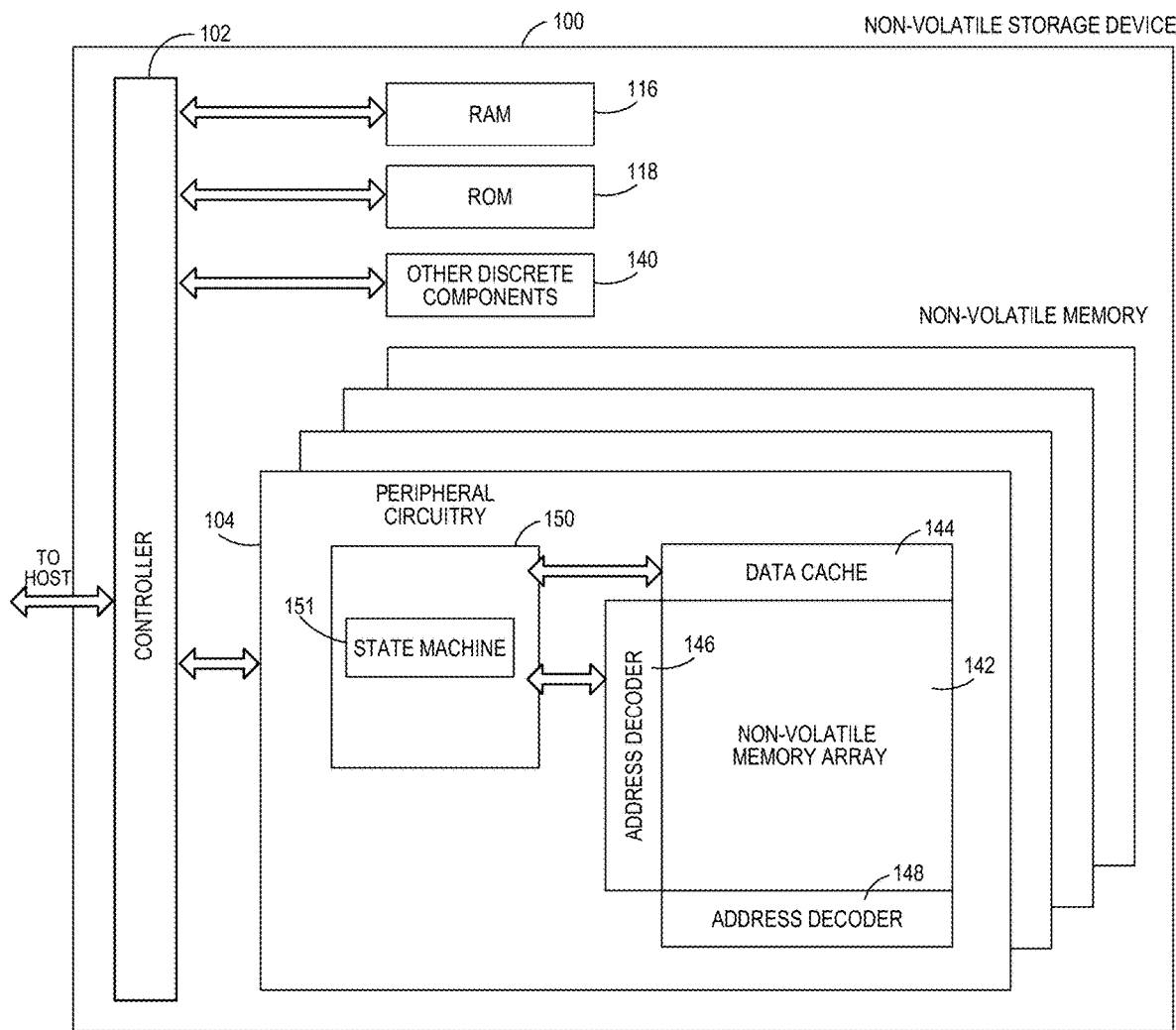
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

Figure 3:
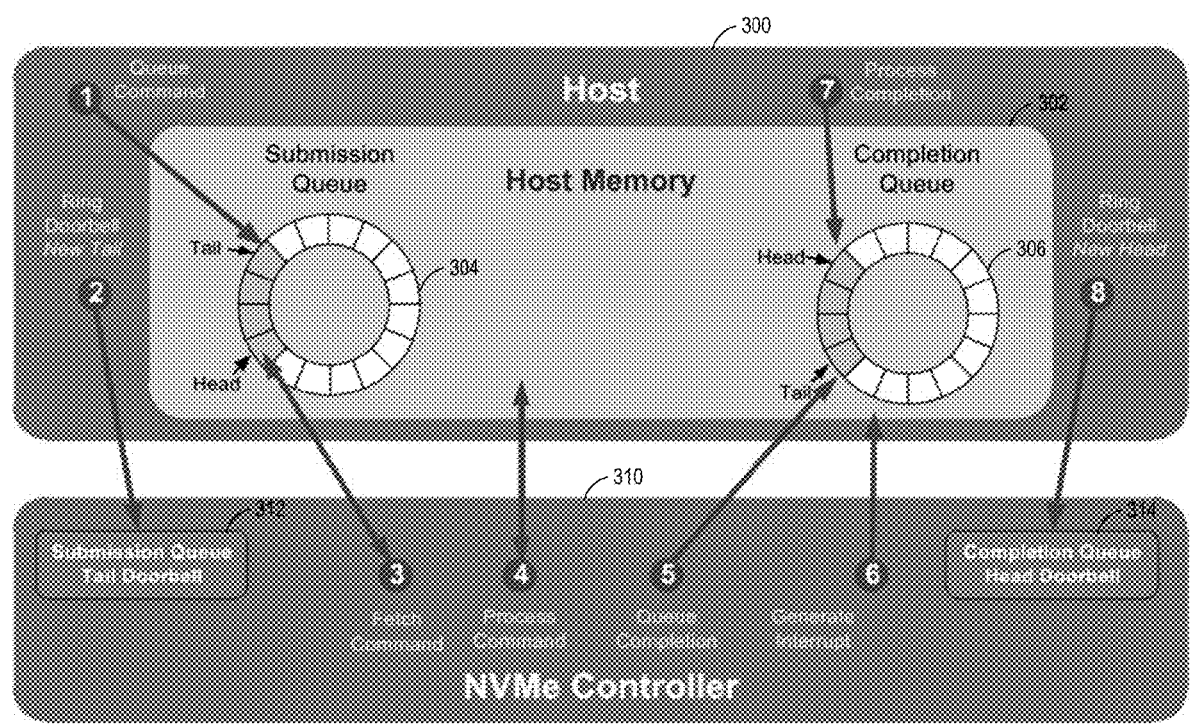
FIG. 3 is a block diagram of the host device and NVMe controller illustrating a sequence for a host device and a memory device to request and process an NVMe command.

As discussed above, NVMe is a standard for accessing non-volatile storage media attached via PCI Express (PCIe) bus. In that regard, FIG. 3 is used to illustrate a sequence of steps for executing a command via the NVMe standard. The NVMe standard discloses a scalable host controller interface designed to address the needs of Enterprise and Client systems that utilize PCI Express-based solid state drives. Such systems are based on a paired submission queue and completion queue mechanism.

As shown in FIG. 3, the host device 300 includes host memory 302, and the memory device includes a controller, such as an NVMe controller 310. In the implementation illustrated in FIG. 3, the host memory 302 includes a submission queue 304 and a completion queue 306. Further, in one implementation, the submission queues and completion queues may have a 1:1 correlation. Alternatively, the submission queues and completion queues do not have a 1:1 correlation.

In practice, at the initialization phase, the host device 300 may instruct the memory device to create the submission queue(s) and corresponding completion queue(s) in a memory resident in the memory device, such as a controller memory buffer.

The submission queue 304 and completion queue 306 may be based on a ring buffer, with a head pointer and a tail pointer. In one implementation, the submission queue and completion queue are circular buffers with fixed slot sizes, such as 64 Bytes for submission queues and 16 Bytes for completion queues. For example, a host device may have up to 64K outstanding commands to a submission queue.

After the submission queue(s) are created, the host device 300 may write a command (or several commands) to the submission queue. This is indicated in FIG. 3 as step 1, labeled "Queue Command". In particular, FIG. 3 illustrates that four commands were written to the submission queue. In step 2, the host device 300 writes to a submission queue tail doorbell register 312 in the memory device. This writing to the submission queue tail doorbell register 312 signifies to the memory device that the host device has queued one or more commands in this specific submission queue 304 (e.g., 4 commands as illustrated in FIG. 3). After which, the memory device writes the command to the submission queue.

In the general case, there may be several submission queues (with potentially many pending commands in the several submission queues). Thus, before performing step 3, the memory device controller may arbitrate between the various submission queues to select the particular submission queue from which to fetch the command(s). In this regard, the memory device may consider a single submission queue, alone, in deciding whether to fetch commands from that single submission queue. Alternatively, the memory device may consider multiple submission queues, in combination, in deciding whether to fetch commands from the multiple submission queues.

Responsive to determining which particular submission queue 304 from which to fetch the command(s), at step 3, the memory device fetches the command(s) from the particular submission queue 304. In practice, the memory device may use one or more arbitration schemes, such as round-robin, weighted round robin, etc. in order to determine which commands to fetch from the submission queue(s). Discussion of various arbitration schemes are disclosed in U.S. patent application Ser. No. 15/585,717, incorporated by reference herein in its entirety. Further, the memory device may access the base address of the particular submission queue 304 plus the pointer on the current head pointer implemented in the host device 300.

At step 4, the memory device processes the command. In one implementation, the memory device parses the commands, and determines the steps to execute the commands (e.g., read/write/etc.). For example, the command may comprise a read command. In the NVMe base specification, responsive to receipt of the read command, the memory device parses the read command, implements the address translation, and accesses the flash to receive the data. After receiving the data, the memory device may perform error correction on the data accessed from flash. Thereafter, the memory device may cause the error-corrected data to be stored on the host device based on information in the command (e.g., the PRP1 discussed below). In particular, the PRP1 may define the location (e.g., the address range) of the host command data buffer that resides on the host. As another example, the command may comprise a write command. In the NVMe base specification, responsive to receipt of the write command, the memory device parses the write command, determines the location of the data on the host device subject to the write, reads the data from the location on the host device, and writes the data to flash memory.

After completing the data transfer, at step 5, the memory device controller sends a completion message to the relevant completion queue 306. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use an MSIe interrupt). The interrupt indicates to the host device that there is an entry on the completion queue 306. As discussed in more detail below, in one implementation, the memory device may use the host command data buffer until the memory device notifies the host device at step 6 that there has been an update to the completion queue 306.

Responsive to receiving the interrupt, the host device 300 determines that there are one or more completion entries pending for the host device 300 in this completion queue 306. At step 7, the host device 300 then processes the entries in the completion queue 306.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306.

Responsive to updating the completion queue head doorbell register 314, the memory device updates the head of the completion queue 306. Given the new head, the memory device is aware as to which entries in the completion queue 306 have already been processed by the host device 300 and may be overwritten.

As discussed above, the NVMe standard includes an NVMe virtualization environment. As one example, the NVMe virtualization environment may have a plurality, such as dozens, of Host applications using different virtual functions over the PCIe bus. In this regard, the memory device is configured to include a QoS methodology to manage the NVMe virtualization environment. In particular, the QoS methodology may manage the requests amongst the different Host application, such as assigning a minimum bandwidth for each Host application, as discussed in further detail below. Thus, the QoS methodology may allot resources amongst the various Host applications and avoid a specific Host application being perpetually denied necessary resources to process its respective work.

As discussed above with regard to FIG. 2A, the memory device may include a bandwidth limiter module 112. Bandwidth limiter module 112 may be implemented either in firmware or in hardware, and may be optimized for NVMe virtualization, as discussed in further detail below. Bandwidth limiter module 112 may manage QoS among the various NVMe users. As discussed above, the NVMe users may be organized in one of several ways including based on: a physical submission queue; a virtual function; a supported namespace ID; or NVMe command stream. Further the NVMe users may be assigned to a bandwidth grouping, with each respective bandwidth grouping having a respective bandwidth limit. The memory device may monitor current bandwidth of each respective bandwidth grouping, and may store the current bandwidth in a memory, such as an internal database. Bandwidth limiter module 112 may thus monitor the various NVMe users using the respective bandwidth grouping with regard to various operations that affect bandwidth. As discussed above with regard to FIG. 3, there are various operations in processing an NVMe command which may affect bandwidth. One such operation is fetching of the command contained or housed in the submission queue. In particular, fetching of the command triggers additional operations that may affect bandwidth, as discussed further below. As one example, most of the bandwidth is typically consumed by the data transfer (e.g., transfer of data from the host to the memory device when processing a write command or transfer of data from the memory device to the host when processing a read command). In this regard, stopping the fetching (such as temporarily delaying the fetching) has an indirect impact on the bandwidth consumption since the halting of processing the command will halt (or delay) additional data transfer.

Thus, bandwidth limiter module 112 may control the fetching operation from the submission queue(s), thereby achieving a predetermined QoS for the NVMe virtualization environment.

At the initialization phase, each user is initialized with the maximum bandwidth allocated for him. The algorithm makes sure that each user does not exceed its pre-allocated bandwidth by controlling the SQ fetching operation. The main benefits of this invention is in terms of quality of service and fairness which are critical parameters in a virtualization environment.

Figure 4:
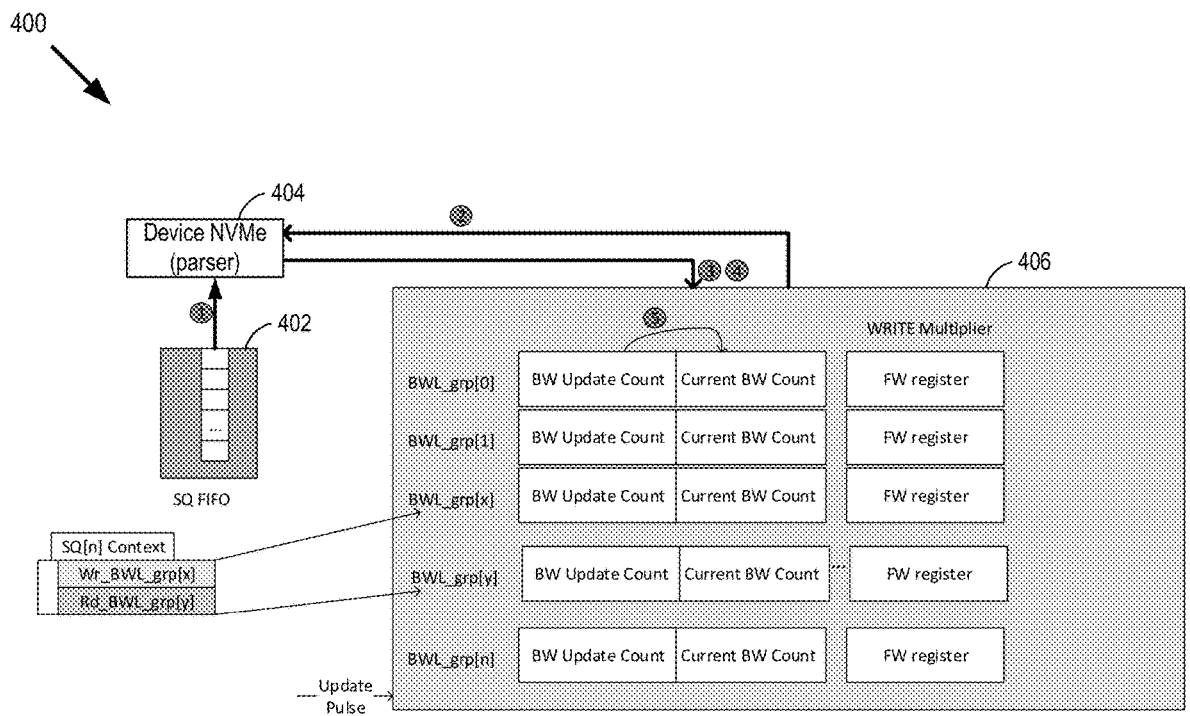
FIG. 4 is a block diagram of the steps in using the bandwidth limiter module when fetching a command.

FIG. 4 is a block diagram 400 of the steps in using the bandwidth limiter module when fetching a command from a submission queue, such as submission queue 402. At step 1, the command is accessed by device NVMe 404, which is configured to parse the accessed command. At step 2, one or more criteria stored in internal database 406 are accessed. The one or more criteria may include the current bandwidth count (Current BW Count) and the write multiplier (as shown in FIG. 4, housed in the WRITE multiplier FW register). The current bandwidth count may be stored for each of the bandwidth groupings. As shown in FIG. 4, there are bandwidth groupings BWL_grp[0], BWL_grp[1], BWL_grp[x], BWL_grp[y], and BWL_grp[n]. Any number of bandwidth groupings are contemplated. Further, each bandwidth grouping may include a bandwidth update count (BW Update Count). As discussed in further detail with regard to FIG. 7, additional bandwidth may be allocated to the different bandwidth groupings. The amount of bandwidth additionally allocated is dependent on the value stored in bandwidth update count. As shown in FIG. 4, each bandwidth grouping has a respective bandwidth update count. Alternatively, the bandwidth update count may be the same for each bandwidth grouping. In one implementation, the value for the bandwidth update count is static. Thus, the amount of additional bandwidth allotted to a particular bandwidth grouping remains constant. Alternatively, the memory device may dynamically analyze the different bandwidth groupings to determine whether one or more bandwidth groupings are being starved of resources. Responsive to this determination, the memory device may dynamically adjust the amount of the additional bandwidth allotted (e.g., increase the additional bandwidth allotted to one bandwidth grouping and decrease the additional bandwidth allotted to another bandwidth grouping). Further, the frequency at which the additional bandwidth may be determined by the update pulse, shown in FIG. 4 as being an input to internal database 406, and discussed further with respect to FIG. 9.

As discussed above, the effect on bandwidth may depend on the type of command fetched. For example, the bandwidth limiter module may determine that a write command has more of an effect on bandwidth. As such, the write multiplier may comprise an indication of the added effect of processing a write command on bandwidth (e.g., a 1½ effect on bandwidth as opposed to processing a read command with the same amount of data; or a 2× effect on bandwidth as opposed to processing a read command with the same amount of data).

Based on the accessed command and the accessed criteria, the bandwidth limiter module may determine whether to fetch the command or delay fetching. At step 3, the bandwidth limiter module may send the results of the determination. As discussed in more detail in FIG. 8, the bandwidth limiter module may determine an effect of fetching the command on the current bandwidth count (e.g., modify the current bandwidth limiter count to account for the effect on bandwidth of fetching the command). Alternatively, or in addition, the bandwidth limiter module may determine whether the fetching of the command results in crossing the threshold of the current bandwidth count (which may result in delaying fetching of subsequent commands). For example, the bandwidth limiter module may send at step 3 the effect of fetching the command on the current bandwidth count (e.g., a decrementing of the current bandwidth count that is indicative of the bandwidth effect of fetching the command). In addition, the bandwidth limiter module may send at step 3 the indication that the fetching of the command results in crossing the threshold of the current bandwidth count. In effect, the fetching of the command results in the memory device determining to disable fetching of commands for this particular bandwidth group. As discussed below, the disabling of fetching of the commands may be temporary, such as until additional bandwidth is allocated sufficiently to fetch additional commands. Step 5 illustrates the allocation of additional bandwidth, such as by adding the bandwidth update count to the current bandwidth count. Further, the update pulse is the trigger to allocate the additional bandwidth.

Figure 5:
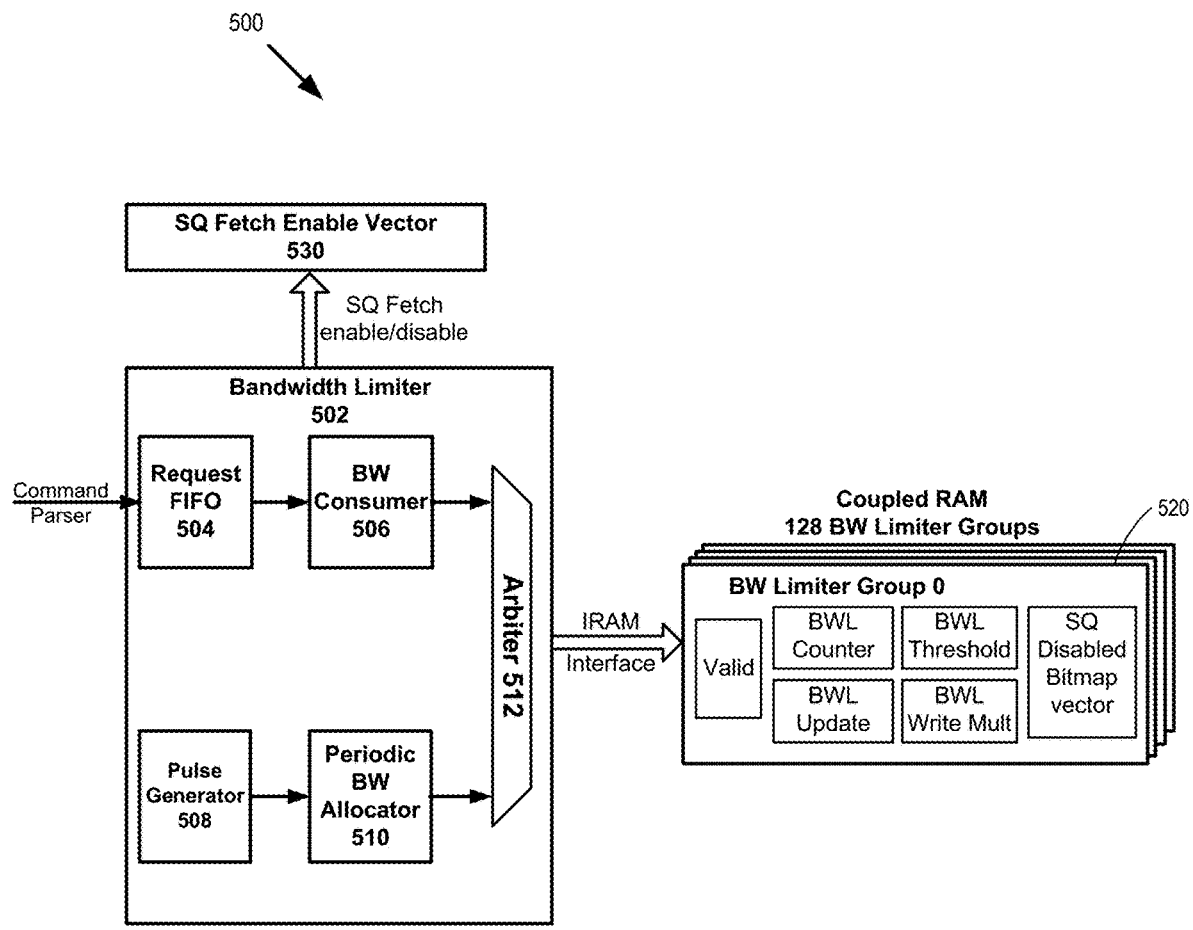
FIG. 5 is a block diagram of the bandwidth limiter module.

FIG. 5 is a block diagram 500 of the bandwidth limiter module 502, the submission queue (SQ) fetch enable vector 530, and the plurality of bandwidth (BW) limiter group (such as BW limiter group 0 (520)). Bandwidth limiter module 502 receives as input a command parser. The command parser may holds commands that were fetched from the host and queued to the command parser. In turn, the command parser may send an input to the request FIFO 504 of bandwidth limiter module 502. The request FIFO 504 includes a listing of the different commands that are to be processed from the various submission queues. The bandwidth (BW) consumer 506 is configured to determine whether, for a command from the request FIFO 504, an effect on the current bandwidth for a bandwidth grouping. In particular, the command may be associated with a particular bandwidth grouping. As such, the BW consumer 506 may access values from the BW limiter group (which is correlated to the particular bandwidth grouping and discussed below) in order to determine the effect of processing the command on the bandwidth for the particular grouping.

Further, the pulse generator 508 is configured to generate a pulse to trigger, which is input to the periodic BW allocator 510. For example, the pulse generator 508 may be configured to generate a pulse every 1 mSec. In turn, responsive to the pulse which may be generated on a periodic basis, the periodic BW allocator 510 is configured to allocate additional bandwidth to the different bandwidth groupings according to values from the BW limiter group. Arbiter 512 is configured to arbitrate between BW consumer 506 and periodic BW allocator 510 when accessing the different BW limiter groups (e.g., BW limiter group 0).

FIG. 5 illustrates one BW limiter group (BW limiter group 0 (520)) with various fields. In one implementation, each bandwidth limiter group may have the associated fields. Alternatively, fewer than all of the bandwidth limiter group may have the associated fields. Example fields in the BW Limiter Group are illustrated in FIGS. 5-6 and include: bandwidth limiter (BWL) counter; BWL threshold; BWL update; BWL write multiplier; submission queue (SQ) disabled bitmap; and valid. BWL counter field stores a value that is indicative of the current count of the bandwidth for the respective bandwidth grouping. In effect, the value in the BWL counter field is indicative of current bandwidth use for the respective bandwidth grouping. The value for the BWL counter field may be represented in one of several ways. In one way, the value may be represented by an amount/sec, such as 1 Gb/sec. Alternatively, the value may simply be represented by a number.

The value for the BWL counter for a respective bandwidth grouping may be decremented based on the commands fetched from submission queues assigned to the respective grouping. This can be represented by the following equation: BWL Count=BWL Count−Command size. For example, fetching a read command that has 0.5 Gb of data (the command size) to read may result in decrementing the value of the BWL counter by 0.5 Gb (which represents the amount of data that will be transmitted via the PCIe bus responsive to processing the read command). Other commands, such as write commands, may affect the bandwidth more than simply the amount of data as indicated in the command. In order to account for the greater effect on bandwidth, BWL write multiplier is used. BWL write multiplier may act as a multiplier to the command size, thereby resulting in a greater effect on the BWL counter (e.g., BWL count=BWL count−(command size*BWL write multiplier). Thus, in the example of a BWL write multiplier of 2 and a write command size of 0.5 Gb, the amount to decrement the BWL count is 1 Gb.

BWL threshold field may comprise one or more thresholds that may be used by BW consumer 506 and periodic BW allocator 510 in order to determine whether to disable and/or enable fetching of commands for the particular bandwidth grouping. For example, BWL threshold field may comprise a low BW threshold (which may be indicative of a low bandwidth limit) and a high BW threshold (which may be indicative of a high bandwidth limit and acting as a re-enable threshold to re-enable fetching of commands). The low BW threshold may be used by BW consumer 506 to determine whether to disable fetching. For example, BW consumer 506 may compare the value in the BWL counter field with the low BW threshold. If the BWL counter field is less than the low BW threshold, BW consumer 506 may disable fetching for the particular bandwidth grouping. In effect, the determination that the value in the BWL counter field is less than the low BW threshold is indicative that the particular bandwidth grouping has spent the bandwidth allocated. Thus, when the particular bandwidth grouping is disabled, fetching from all submission queues associated with the particular bandwidth grouping are disabled. This disabling of the fetching may be sent, via SQ fetch disable to SQ fetch enable vector 530 so that fetching for the bandwidth grouping is temporarily disabled. Thus, the processing of subsequent commands (such as other commands in the request FIFO 504 or subsequently received commands) for the bandwidth grouping may be delayed. As another example, periodic BW allocator 510 may compare the value in the BWL counter field with the high BW threshold. If the BWL counter field is greater than the high BW threshold, periodic BW allocator 510 may enable fetching for the particular bandwidth grouping. In effect, the determination that the value in the BWL counter field is greater than the high BW threshold is indicative that the particular bandwidth grouping has additional bandwidth that can be used. Thus, when the particular bandwidth grouping is enabled, commands may be fetched from all submission queues associated with the particular bandwidth grouping (until fetching is thereafter disabled). This enabling of the fetching may be sent, via SQ fetch enable to SQ fetch enable vector 530 so that fetching for the bandwidth grouping is re-enabled. The low BW threshold and high BW threshold may be static (e.g., unchangeable for the life of the memory device) or may be dynamic (e.g., changeable between power-ups of the memory device).

As discussed above, additional bandwidth may be allocated to the bandwidth groupings. In that regard, BWL Update may indicate the amount of additional bandwidth allocated responsive to receiving the periodic update pulse. For example, the memory device may seek to allocate a specific bandwidth group 1 Gb/sec. In the event that the update pulse is every 1 mSec, the BWL Update=1 Mb (with every 1 mS, the BWL count being incremented by 1 Mb so that after 1 second, 1 Gb is added to BWL count).

Thus, the BWL count is incremented periodically with additional allocated bandwidth. However, in times of idle, the memory device may seek to limit the amount of additional bandwidth allocated. In that regard, BWL max sets the upper limit or maximum value of the BWL count. For example, in the event that the memory device is idle for an extended period of time, the bandwidth limiter module limits the amount of additional bandwidth allocated to the value of BWL max.

The valid field indicates whether the BW limiter group is enabled. If so, the values in the BW limiter group are used to determine whether to fetch commands from submission queues associated with the BW limiter group. Otherwise (e.g., if the valid field is not set), the values in the BW limiter group are ignored and not used to determine whether to fetch commands. Finally, the SQ disabled bitmap vector field indicates whether a submission queue is disabled from having commands therefrom. In this regard, the SQ disabled bitmap vector field is configured to indicate that the processing of subsequent commands for submission queues associated with the SQ disabled bitmap vector field are temporarily stopped. Thus, responsive to a bandwidth grouping consuming more than its allotted share of bandwidth, the SQ disabled bitmap vector field may be set to indicate that the submission queues associated with the bandwidth grouping are disabled from commands being fetched, as discussed further below.

Figure 7:
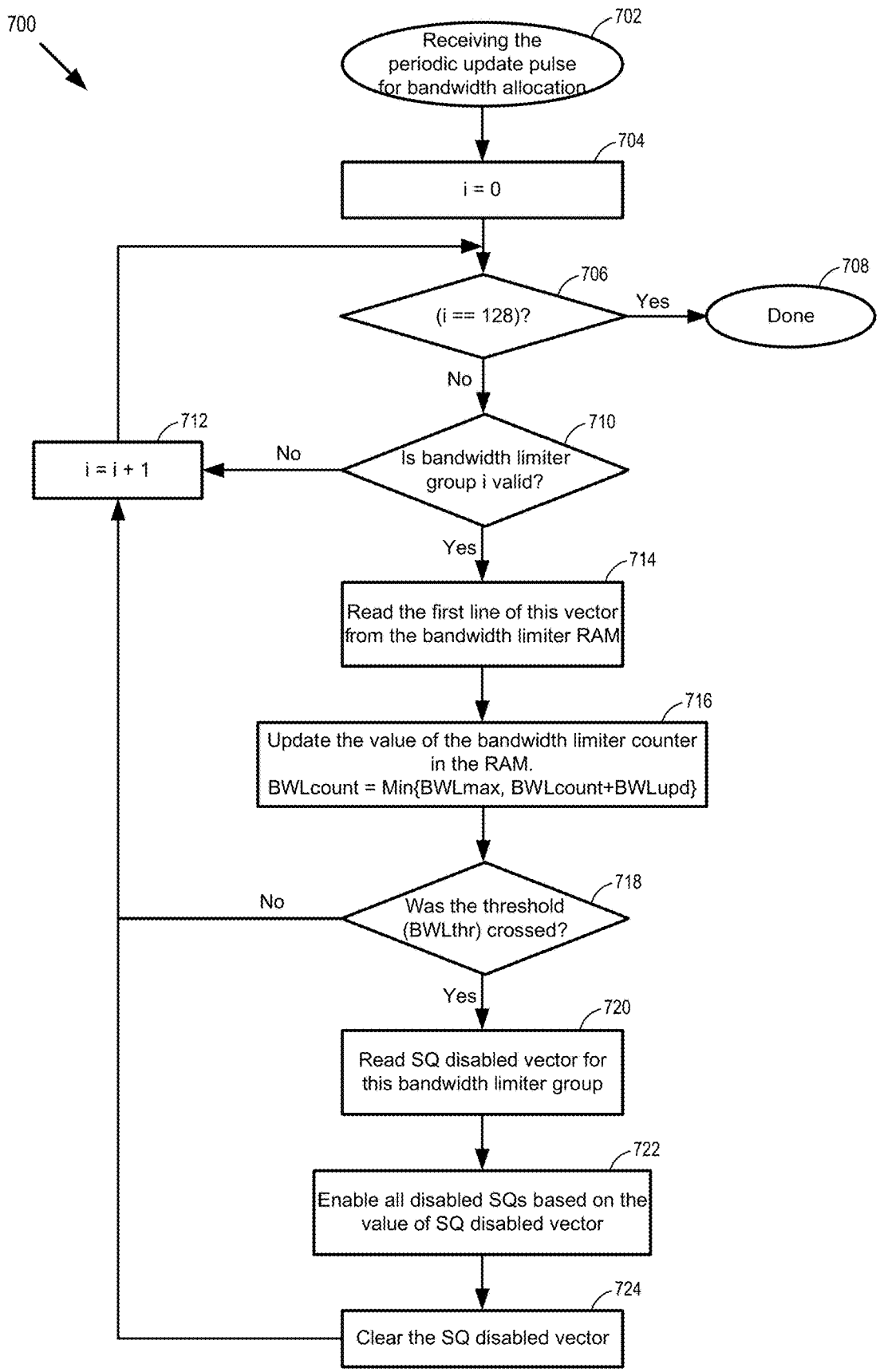
FIG. 7 is a flow chart for determining how to allocate bandwidth.

FIG. 7 is a flow chart 700 for determining how to allocate bandwidth. At 702, the periodic update pulse for allocating bandwidth is received. As discussed above, the update pulse may serve as a trigger to allocate additional bandwidth to one or more of the bandwidth groupings. At 704, a counter (i) is set to zero. At 706, it is determined whether the counter is equal to 128. Various numbers of bandwidth groupings are contemplated. For example, FIG. 7 illustrates 128 as the number of bandwidth groupings. If flow chart 700 has stepped through all 128 bandwidth groupings, flow chart is done at 708. If not, at 710, it is determined whether the specific bandwidth grouping is valid. As discussed above, one field comprises the valid field, which indicates whether QoS limiting of fetching is enabled for the bandwidth grouping. If so, the values in the BW limiter group are used to determine whether to fetch commands from submission queues associated with the BW limiter group. If not, the values in the BW limiter group are ignored and not used to determine whether to fetch commands.

At 714, the first line of this vector from the bandwidth limiter RAM is read. For example, various values from internal database 406 may be read, such as BW Update Count. At 716, the value for the bandwidth limiter counter is updated in the RAM. One equation for the BWL count comprises the minimum of two values: BWLmax and BWLcount+BWLupd. As discussed above, the BWL count value is updated with each update pulse by adding the BW Update Count. For example, if the update pulse is sent every 1 mSec and the BW Update Count is 1 Mb, then for each pulse, the BWL count is incremented 1 Mb (indicating additional bandwidth allocation for the specific grouping). However, for long idle periods, the BWL count is limited by BWL max. For example, if BWL max=5 Gb, the maximum amount of bandwidth allotted to BWL count is 5 Gb.

At 718, it is determined whether BWL count crosses the threshold (BWLthr). As discussed above, various thresholds may be used such as a high level threshold, which when crossed, indicates that sufficient bandwidth is present to re-enable fetching of commands for the particular bandwidth grouping. If so, at 720, the submission queues (that are disabled) for this bandwidth grouping are read, at 722, the disabled submission queues are enabled, and at 724, the submission queue disabled vector is cleared (e.g., the SQ disabled bitmap vector is cleared). At 712, the counter (i) is incremented and the flow chart 700 loops back to 706.

Figure 8:
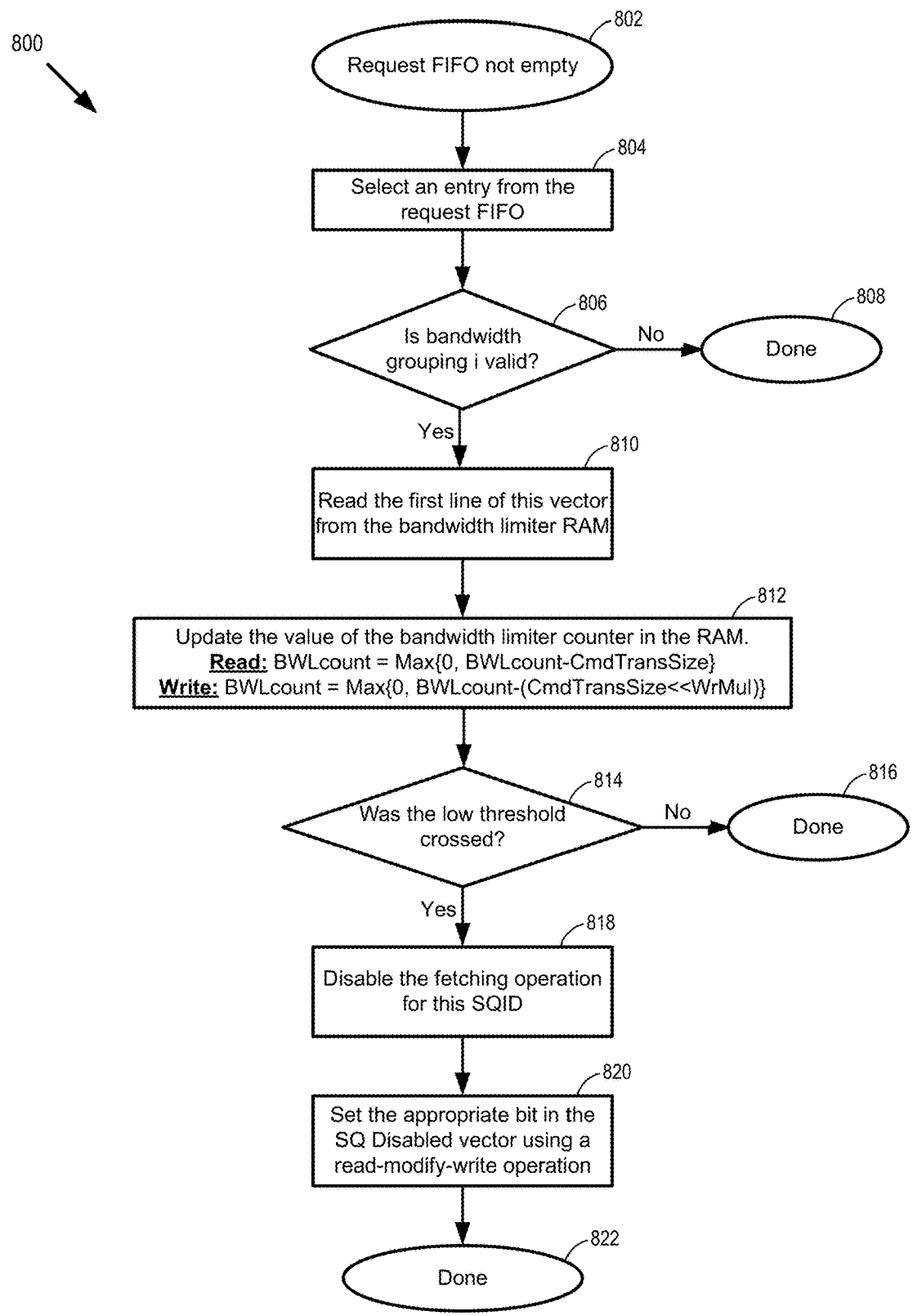
FIG. 8 is a flow chart for determining whether to fetch a command based on the bandwidth limiter module.

FIG. 8 is a flow chart 800 for determining whether to fetch a command based on the bandwidth limiter module. At 802, the request FIFO is not empty. In this regard, there is a command that is available for fetching. If so, at 804, an entry is selected from the request FIFO. In one implementation, the entry selected is the oldest entry in the request FIFO.

At 806, it is determined whether the bandwidth grouping i associated with this command is valid (e.g., enabled). As discussed above, the bandwidth grouping may be enabled for QoS limiting of fetching, such as via the valid bit in FIG. 6. If so, the values in the BW limiter group are used to determine whether to fetch commands from submission queues associated with the BW limiter group. If not, the values in the BW limiter group are ignored and not used to determine whether to fetch commands. If the bandwidth grouping is not enabled for QoS limiting of fetching, the flow chart 800 is done at 808. If so, at 810, the first line of this vector from the bandwidth limiter RAM is read. For example, various values from internal database 406 may be read, such as BWL Count.

At 812, the value of the bandwidth limiter counter (BWL Count) is updated. The updating of the bandwidth limiter counter (BWL Count) may depend on whether the command for fetching is a read or write command. As shown in FIG. 8, for a read, the bandwidth limiter counter (BWL Count) is the maximum of either zero (0) or BWL Count−transfer size of the command (e.g., how much data is being read). In this regard, if BWL count is negative after subtracting the transfer size of the command, the value of BWL Count will equal 0. Likewise, for a write, the bandwidth limiter counter (BWL Count) is the maximum of either zero (0) or BWL Count−transfer size of the command (e.g., how much data is being written) multiplied by the write multiplier.

At 814, it is determined whether BWL count has crossed the low threshold. As discussed above, crossing of the low BW threshold is indicative that the particular bandwidth grouping has spent the bandwidth allocated. If the BWL count has not crossed the low threshold, flow chart 800 is done at 816. If the BWL count has crossed the low threshold, at 818, the fetching operation for the particular submission queue identification (SQID) is disabled. Further, at 820, the SQ disabled bitmap vector is set to indicate that the particular bandwidth grouping is disabled from fetching. At 822, flow chart 800 is done.

As one example, submission queue 1 may initially be assigned a bandwidth of 2 Gb/sec, with this value being stored in BWL count as 2 Gb. Further, every 1 second, an additional allotment of 2 Gb is added to BWL count (e.g., 2 Mb every 1 mSec). Further, values for the low BW threshold is zero and the high BW threshold is 3 Gb. Thus, when crossing 0 (into negative), all of the bandwidth has been consumed for submission queue 1. Temporarily, execution of any command from submission queue 1 is disabled. In practice, after assigning BWL count as 2 Gb, a read command for submission queue 1 is received with a size of 4 Gb (which is actually more than the allotted bandwidth). Nevertheless, the low BW threshold of 0 is crossed, and fetching of commands from submission queue 1 is temporarily halted. In one implementation, the BWL count does not go below zero. Thus, the delay for submission queue 1 will be 1½ seconds (adding 3 Gb to BWL count until it crosses the high BW threshold of 3 Gb). In this regard, after fetching the read command with a size of 4 Gb, the BWL count is set to zero. Alternatively, the BWL count may go below zero. In the given example, after fetching the read command with a size of 4 Gb, the BWL count is −2 Gb. Thus, the delay for submission queue 1 will be 2½ seconds.

Figure 9:
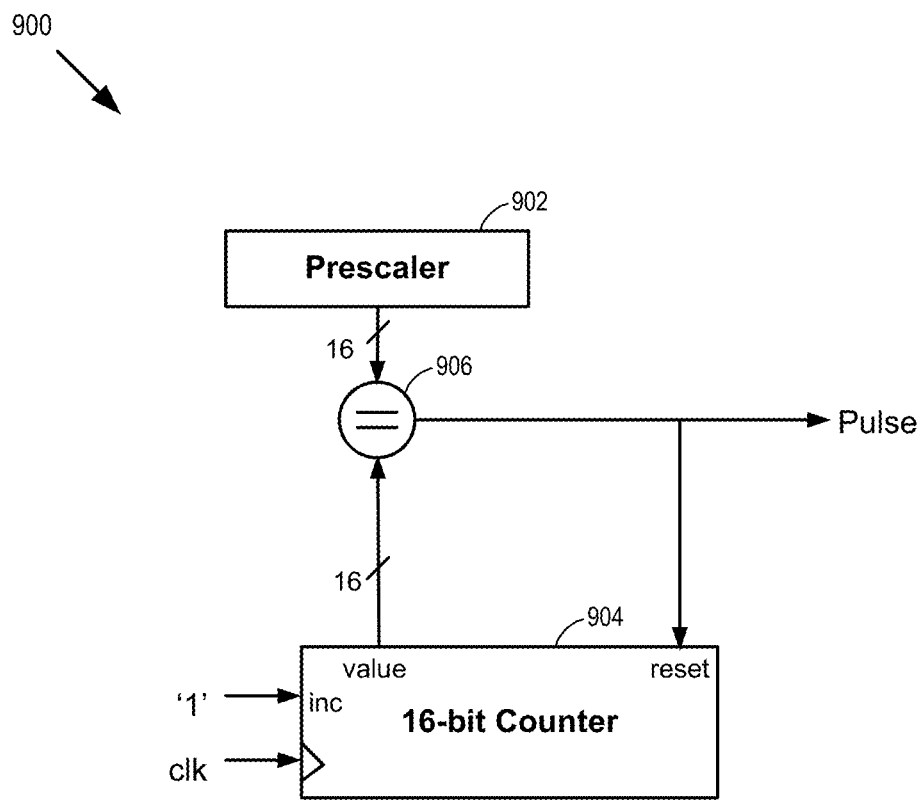
FIG. 9 is a block diagram of the pulse generator configured to generate a pulse that triggers allocation of bandwidth, such as illustrated in FIG. 7.

FIG. 9 is a block diagram of the pulse generator 900 configured to generate a pulse that triggers allocation of bandwidth, such as illustrated in FIG. 7. The Pulse Generator 900 may be configured to generate a pulse every X microseconds, where X may be configured by the firmware. This pulse may be used for the bandwidth limiter periodic bandwidth allocation algorithm. The firmware may configure a prescaler value from prescaler 902 for this counter.

When a value of the counter 904 is equal to the pre-configured prescaler value, the logic 906 is configured to generate a pulse. This pulse may also cause a reset to the value of the counter 904.

At the initialization phase, the firmware may configure the prescaler value in the prescaler 902 to cause it to generate the pulse every X microseconds. For example, when the bandwidth limiter block receives a clock frequency of 800 MHz, the configured prescaler value is 0x640 in order to have a pulse every 2 µSec.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), phase-change memory ("PCM"), or other elements comprising semiconductor or other material capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method for a memory device to fetch a command from a submission queue, the method comprising:
   in the memory device:
      determining whether the submission queue includes a command;
      in response to determining that the submission queue contains a command, modifying bandwidth consumption based on the command by decrementing a bandwidth counter based on an amount of data transfer necessitated by performing the command, the bandwidth consumption associated with the submission queue;
      comparing the modified bandwidth consumption associated with the submission queue with a bandwidth limit associated with the submission queue;
      determining, based on the comparison, whether to delay fetching of subsequent commands; and
      in response to determining to delay fetching of the subsequent commands, delaying fetching of the subsequent commands.

2. The method of claim 1, wherein the delay in fetching the subsequent commands is dependent on additional bandwidth allotted to the modified bandwidth consumption.

3. The method of claim 2, wherein the additional bandwidth is allotted to the bandwidth consumption on a periodic basis.

4. The method of claim 3, wherein delaying fetching of the subsequent commands comprises:
   determining whether the bandwidth consumption is at least equal to an upper bandwidth limit; and
   responsive to determining that the bandwidth consumption is at least equal to the upper bandwidth limit, re-enabling fetching of the subsequent commands.

5. The method of claim 3, wherein the additional bandwidth is allotted up to a maximum amount.

6. The method of claim 1, wherein the bandwidth consumption is modified based on a type of the command.

7. The method of claim 6, wherein:
   the types of command comprises a write command and a read command; and
   the modification to the bandwidth consumption is different based on whether the type of the command fetched is the write command or the read command.

8. The method of claim 7, wherein the write command is assigned a multiplier to multiply an effect on the bandwidth consumption in executing the write command.

9. The method of claim 1, wherein:
   the submission queue is associated with a bandwidth grouping; and
   the bandwidth limit is associated with the bandwidth grouping.

10. The method of claim 9, wherein the bandwidth grouping is one of a virtual function, a namespace, or a command stream identifier (ID).

11. A memory device comprising:
   memory comprising a submission queue;
   a communication interface configured to communicate with a host device; and
   a controller in communication with the memory and the communication interface, the controller configured to:
      receive, via the communication interface from the host device, a command for the submission queue;
      determine, based on bandwidth assigned to the submission queue, whether to delay processing of the command, wherein the bandwidth assigned to the submission queue is indicated by a current bandwidth usage indicator that is modified to account for processing of previous commands;
      responsive to determining to delay processing of the command, delay processing of the command until a predetermined amount of bandwidth is allotted to the submission queue; and
      after the predetermined amount of bandwidth is allotted to the submission queue, process the command.

12. The memory device of claim 11, wherein the controller is configured to process the command by fetching the command from the submission queue.

13. The memory device of claim 12, wherein the controller is further configured to:
   determine, based on processing of previous commands, that the bandwidth assigned to the submission queue has been exceeded; and
   designate, for subsequently received commands, to delay the processing of subsequently received commands; and
   wherein the controller is configured to determine whether to delay processing of the command by determining whether the controller previously designated to delay the processing of the subsequently received commands.

14. The memory device of claim 13, wherein the controller is configured to determine that the bandwidth assigned to the submission queue has been exceeded by:
   accessing a current bandwidth usage indicator;
   modifying the current bandwidth usage indicator to account for the processing of the previous commands;
   comparing the modified current bandwidth usage indicator with a bandwidth limit associated with the submission queue; and
   determining, based on the comparison, that the bandwidth assigned to the submission queue has been exceeded.

15. The memory device of claim 14, wherein the controller is configured to delay processing of the command until the predetermined amount of bandwidth is allotted to the submission queue by:
   periodically allotting additional bandwidth to the submission queue; and
   responsive to determining that the allotted additional bandwidth exceeds a threshold, processing the command.

16. The memory device of claim 15, wherein:
the threshold comprises a re-enable threshold; and
the bandwidth limit is different from the re-enable threshold.

17. A non-volatile memory device comprising:
memory comprising a submission queue;
a communication interface configured to communicate with a host device;
means for receiving, via the communication interface from the host device, a command for the submission queue;
means for determining, based on bandwidth assigned to the submission queue, whether to delay processing of the command, wherein the bandwidth assigned to the submission queue is indicated by a counter that is modified to account for processing of previous commands;
means, responsive to determining to delay processing of the command, for delaying processing of the command until a predetermined amount of bandwidth is allotted to the submission queue; and
means, after the predetermined amount of bandwidth is allotted to the submission queue, for processing the command.

18. The memory device of claim 17, wherein the means for processing the command comprises means for fetching the command from the submission queue.

19. The memory device of claim 18, further comprising:
means for determining, based on processing of previous commands, that the bandwidth assigned to the submission queue has been exceeded; and
means for designating, for subsequently received commands, to delay the processing of subsequently received commands; and
wherein the means for determining whether to delay processing of the command comprises means for determining whether the means for designating previously designated to delay the processing of the subsequently received commands.

20. The memory device of claim 17, wherein the memory comprises a three-dimensional memory.

* * * * *